United States Patent
Sato et al.

(10) Patent No.: US 12,141,224 B2
(45) Date of Patent: Nov. 12, 2024

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventors: Masashi Sato, Kanagawa (JP); Hiroshi Yonekubo, Kanagawa (JP); Takuya Osugi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/650,280

(22) Filed: Apr. 30, 2024

(65) Prior Publication Data

US 2024/0289414 A1 Aug. 29, 2024

Related U.S. Application Data

(63) Continuation of application No. PCT/JP2022/036935, filed on Oct. 3, 2022.

(30) Foreign Application Priority Data

Nov. 26, 2021 (JP) ................................. 2021-191810

(51) Int. Cl.
*G06F 17/11* (2006.01)
*G06N 10/60* (2022.01)

(52) U.S. Cl.
CPC ............. *G06F 17/11* (2013.01); *G06N 10/60* (2022.01)

(58) Field of Classification Search
CPC ................................ G06F 17/11; G06N 10/60
(Continued)

(56) References Cited

U.S. PATENT DOCUMENTS

2018/0053112 A1 2/2018 Bravyi et al.
2020/0160204 A1 5/2020 Johnson et al.
(Continued)

FOREIGN PATENT DOCUMENTS

EP 4235526 A1 * 8/2023 ............. G06F 17/11
JP 2019-531008 A 10/2019
(Continued)

OTHER PUBLICATIONS

International Search Report issued in PCT/JP2022/036935; mailed Jan. 10, 2023.
(Continued)

*Primary Examiner* — Tan V Mai
(74) *Attorney, Agent, or Firm* — Studebaker & Brackett PC

(57) ABSTRACT

In a case of causing an Ising machine to execute a process of solving an optimization problem by obtaining a value of an unknown variable using a first objective function, the value of the unknown variable being correlated with the number of quantum bits used in solving the optimization problem using the Ising machine, an information processing apparatus derives a smallest value for the unknown variable within a range in which a feasible solution of the optimization problem is obtained by using a second objective function different from the first objective function, and performs control of causing the Ising machine to execute a process of solving the optimization problem defined by a mathematical model including the derived value for the unknown variable and the first objective function.

7 Claims, 9 Drawing Sheets

(58) Field of Classification Search
USPC .......................................................... 708/446
See application file for complete search history.

(56) References Cited

U.S. PATENT DOCUMENTS

| | | |
|---|---|---|
| 2020/0401650 A1 | 12/2020 | Chen et al. |
| 2021/0232657 A1 | 7/2021 | Irie et al. |
| 2023/0077665 A1* | 3/2023 | Kuttimalai .............. G06F 17/11 |
| | | 700/90 |
| 2023/0342416 A1* | 10/2023 | Ide .......................... G06F 17/16 |

FOREIGN PATENT DOCUMENTS

| | | |
|---|---|---|
| JP | 2020-184759 A | 11/2020 |
| JP | 2021-002331 A | 1/2021 |
| JP | 2021-117977 A | 8/2021 |
| WO | 2020/106955 A1 | 5/2020 |

OTHER PUBLICATIONS

Written Opinion of the International Searching Authority issued in PCT/JP2022/036935; mailed Jan. 10, 2023.
An Office Action mailed by the Japanese Patent Office on Aug. 20, 2024, which corresponds to Japanese Patent Application No. 2023-563535 and is related to U.S. Appl. No. 18/650,280; with English language translation.

* cited by examiner

INFORMATION PROCESSING APPARATUS, INFORMATION PROCESSING METHOD, AND INFORMATION PROCESSING PROGRAM

CROSS-REFERENCE TO RELATED APPLICATIONS

This application is a continuation of International Application No. PCT/JP2022/036935, filed on Oct. 3, 2022, which claims priority from Japanese Patent Application No. 2021-191810, filed on Nov. 26, 2021. The entire disclosure of each of the above applications is incorporated herein by reference.

BACKGROUND

1. Technical Field

The present disclosure relates to an information processing apparatus, an information processing method, and an information processing program.

2. Description of the Related Art

JP2021-117977A discloses a technique of a quantum computer performing calculation processing for obtaining a solution of a combinatorial optimization problem in addition to a classical computer performing a part of the calculation processing.

JP2020-184759A discloses a technique of grouping a plurality of antennas provided in a plurality of base stations by quantum annealing.

SUMMARY

Incidentally, an Ising machine is known as the quantum computer specialized in solving the optimization problem. Examples of the Ising machine include a quantum annealing machine using properties of quantum mechanics, a coherent Ising machine using properties of light, and a digital annealer configured of a digital circuit. In addition, in order to solve the optimization problem using the Ising machine, the optimization problem is modeled. Examples of the model that can be solved using the Ising machine include a quadratic unconstrained binary optimization (QUBO) model in which the optimization problem is modeled by a quadratic form of a binary variable of 0 or 1, and an Ising model in which the optimization problem is modeled by a quadratic form of a binary variable of −1 or 1. The QUBO model and the Ising model can be converted into each other.

However, the scale of the optimization problem that can be solved by the Ising machine is smaller than the scale of the optimization problem that can be solved by a conventional general-purpose computer (also referred to as a classical computer) such as a Von Neumann computer. This is because it is difficult to increase the number of quantum bits, which is a calculation unit of the quantum computer. In the techniques disclosed in JP2021-117977A and JP2020-184759A, the number of quantum bits in a case where the optimization problem is calculated by the Ising machine is not taken into consideration.

The present disclosure has been made in view of the above circumstances, and an object of the present disclosure is to provide an information processing apparatus, an information processing method, and an information processing program capable of reducing the number of quantum bits in a case where an optimization problem is calculated by an Ising machine.

According to the present disclosure, there is provided an information processing apparatus comprising at least one processor and causing an Ising machine to execute a process of solving an optimization problem by obtaining a value of an unknown variable using a first objective function, the value of the unknown variable being correlated with the number of quantum bits used in solving the optimization problem using the Ising machine, in which the processor derives a minimum value for the unknown variable within a range in which a feasible solution of the optimization problem is obtained by using a second objective function different from the first objective function, and performs control of causing the Ising machine to execute a process of solving the optimization problem defined by a mathematical model including the derived value for the unknown variable and the first objective function.

In the information processing apparatus according to the present disclosure, the second objective function may be an objective function capable of relaxing a constraint condition compared to the first objective function. As a result, it is possible to reduce the amount of calculation.

In addition, in the information processing apparatus according to the present disclosure, the unknown variable may be stored in a quantum bit group including a plurality of quantum bits, and the value of the unknown variable may be represented by a position where the quantum bit is 0 or 1 in the quantum bit group. As a result, it is possible to reduce a possibility that the feasible solution cannot be obtained.

In addition, in the information processing apparatus according to the present disclosure, the Ising machine including at least one processor may be provided, and the processor of the Ising machine may execute the process of solving the optimization problem defined by the mathematical model. As a result, it is possible to efficiently solve the optimization problem.

According to the present disclosure, there is provided an information processing method executed by a processor of an information processing apparatus including at least one processor and causing an Ising machine to execute a process of solving an optimization problem by obtaining a value of an unknown variable using a first objective function, the value of the unknown variable being correlated with the number of quantum bits used in solving the optimization problem using the Ising machine, the method comprising: deriving a minimum value for the unknown variable within a range in which a feasible solution of the optimization problem is obtained by using a second objective function different from the first objective function; and performing control of causing the Ising machine to execute a process of solving the optimization problem defined by a mathematical model including the derived value for the unknown variable and the first objective function.

According to the present disclosure, there is provided an information processing program executed by a processor of an information processing apparatus including at least one processor and causing an Ising machine to execute a process of solving an optimization problem by obtaining a value of an unknown variable using a first objective function, the value of the unknown variable being correlated with the number of quantum bits used in solving the optimization problem using the Ising machine, the program causing the processor to execute: deriving a minimum value for the unknown variable within a range in which a feasible solution of the optimization problem is obtained by using a second objective function different from the first objective function; and performing control of causing the Ising machine to execute a process of solving the optimization problem defined by a mathematical model including the derived value for the unknown variable and the first objective function.

According to the present disclosure, it is possible to reduce the number of quantum bits in a case where the optimization problem is calculated by the Ising machine.

DETAILED DESCRIPTION

Hereinafter, an embodiment for carrying out the technique of the present disclosure will be described in detail with reference to the drawings. In each of the following embodiments, an example will be described in which a QUBO model is applied as a mathematical model representing an optimization problem to be solved by an Ising machine.

First Embodiment

Figure 1:
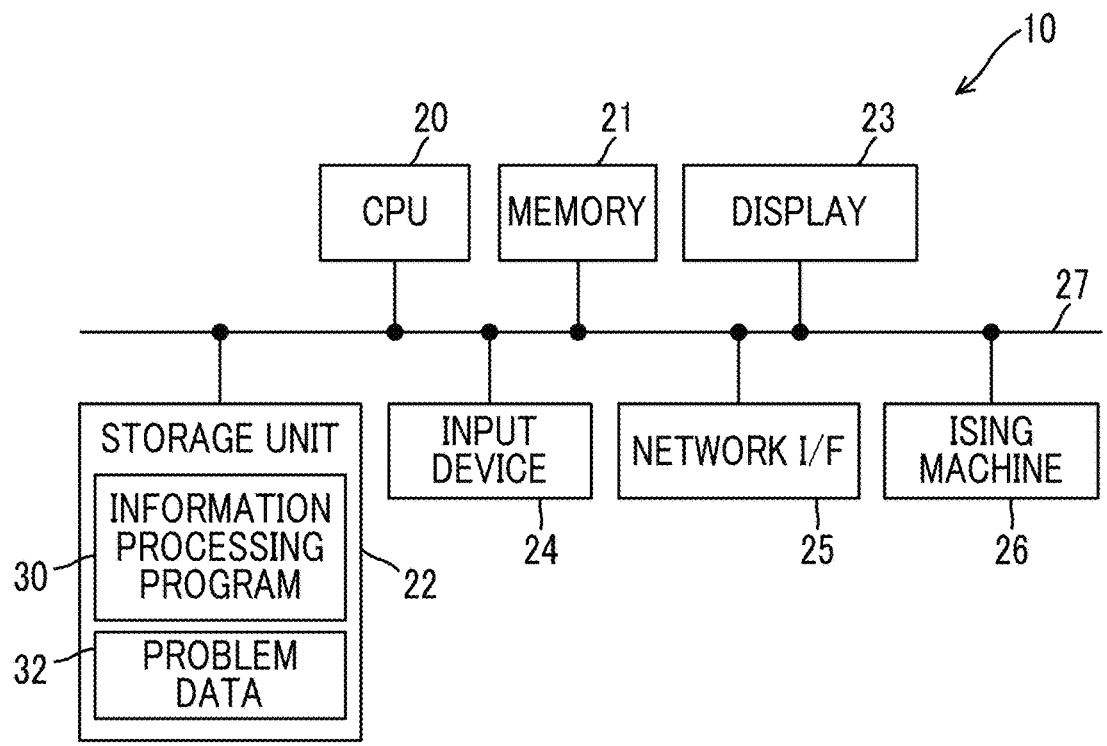
FIG. 1 is a block diagram showing an example of a hardware configuration of an information processing apparatus.

First, with reference to FIGS. 1 and 2, a hardware configuration of an information processing apparatus 10 according to the present embodiment will be described. Examples of the information processing apparatus 10 include a server computer. As shown in FIG. 1, the information processing apparatus 10 includes a central processing unit (CPU) 20, a memory 21 as a temporary storage region, and a non-volatile storage unit 22. In addition, the information processing apparatus 10 includes a display 23 such as a liquid crystal display, an input device 24 such as a keyboard and a mouse, a network interface (I/F) 25 connected to a network, and an Ising machine 26. The CPU 20, the memory 21, the storage unit 22, the display 23, the input device 24, the network I/F 25, and the Ising machine 26 are connected to a bus 27. The information processing apparatus 10 may comprise a plurality of the Ising machines 26.

The storage unit 22 is realized by a hard disk drive (HDD), a solid state drive (SSD), a flash memory, or the like. An information processing program 30 is stored in the storage unit 22 as a storage medium. The CPU 20 reads out the information processing program 30 from the storage unit 22, loads the read out information processing program 30 in the memory 21, and executes the loaded information processing program 30.

In addition, the storage unit 22 stores problem data 32 for modeling an optimization problem that is a target of solution processing by the information processing apparatus 10. Details of the optimization problem represented by the problem data 32 will be described below.

The Ising machine 26 is dedicated hardware for handling the QUBO model, and is mounted on, for example, an expansion card slot of the information processing apparatus 10. The Ising machine 26 is realized by, for example, a digital circuit such as a field programmable gate array (FPGA). In a case where the QUBO model is input via the bus 27 by the CPU 20, the Ising machine 26 performs a process of solving the optimization problem defined by the QUBO model, and outputs a result of the processing to the CPU 20. The Ising machine 26 may be a computer provided outside the information processing apparatus 10, such as a cloud server connected via the network.

Figure 2:
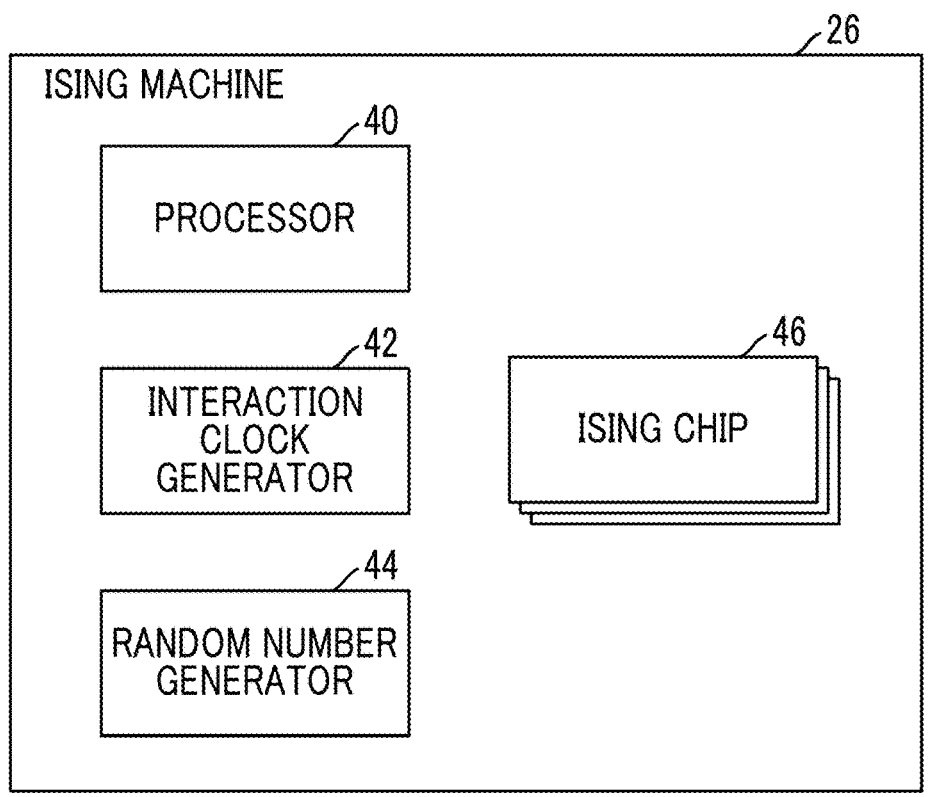
FIG. 2 is a block diagram showing an example of a hardware configuration of an Ising machine.

As shown in FIG. 2, the Ising machine 26 includes a processor 40, an interaction clock generator 42, a random number generator 44, and a plurality of Ising chips 46. The processor 40, the interaction clock generator 42, the random number generator 44, and the plurality of Ising chips 46 are connected to each other to enable the exchange of information. The processor 40 performs the process of solving the optimization problem by controlling the interaction clock generator 42, the random number generator 44, and each Ising chip 46.

The interaction clock generator 42 generates a clock for performing interaction between bits in a case where the Ising chip 46 handles the QUBO model. The random number generator 44 generates a random number, which is a random bit string, for preventing search processing of a solution which is feasible by the Ising chip 46 from falling into a local optimal solution. The Ising chip 46 includes a memory cell that stores a bit, an interaction coefficient, an external magnetic field coefficient, and the like.

Figure 3:
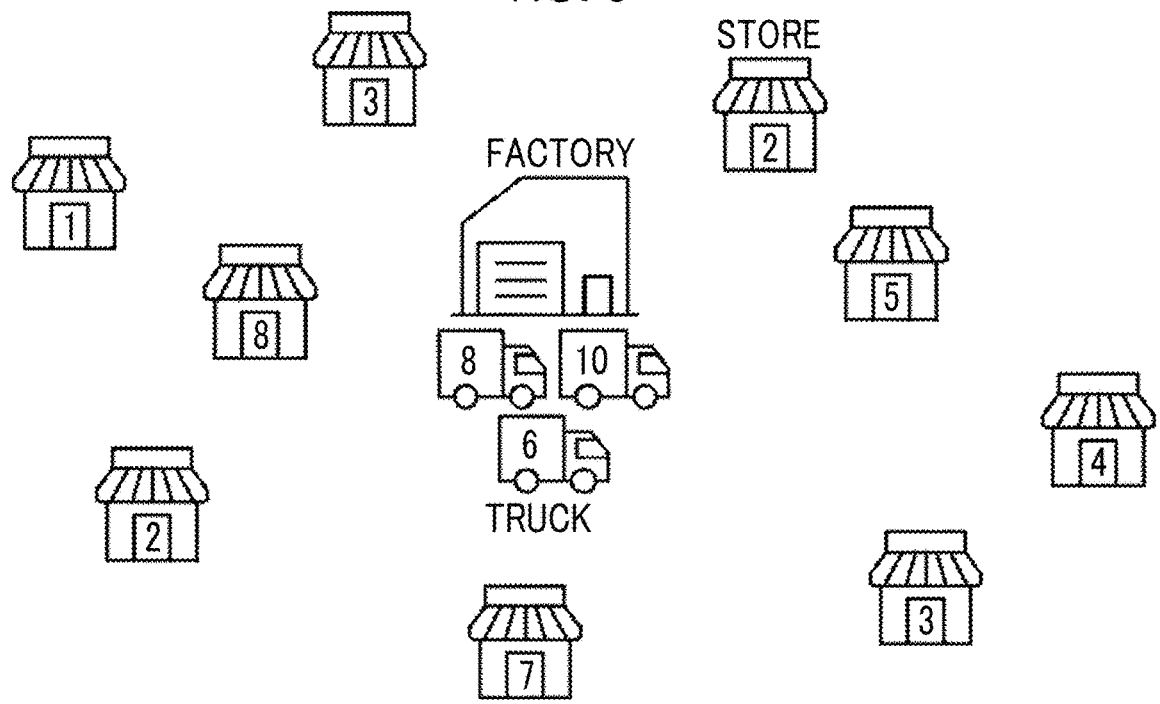
FIG. 3 is a schematic diagram for describing an optimization problem according to a first embodiment.
Figure 4:
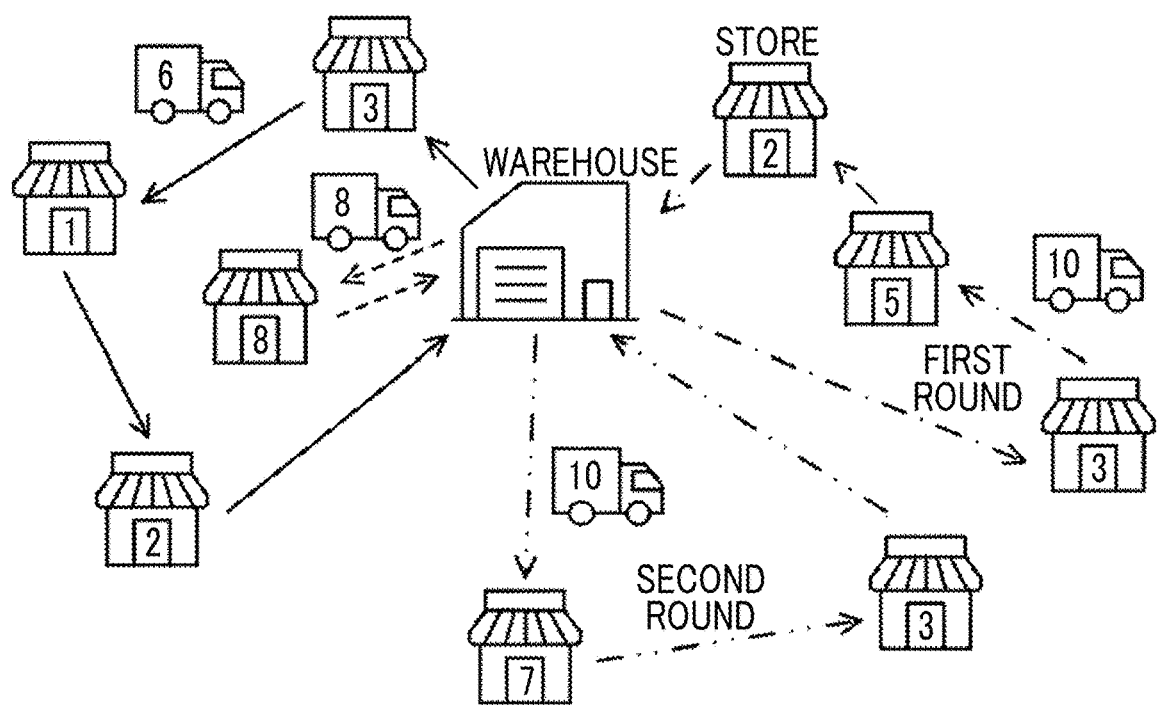
FIG. 4 is a schematic diagram showing an example of a solution of the optimization problem according to the first embodiment.

Next, an example of the optimization problem represented by the problem data 32 according to the present embodiment will be described with reference to FIGS. 3 and 4. As shown in FIG. 3, in the present embodiment, as an example of the optimization problem, an example will be described in which a problem of determining a route for delivering a product from one warehouse to a plurality of stores using a plurality of trucks (hereinafter, referred to as a "route determination problem") is applied. FIG. 3 shows an example in which the number of trucks is three and the number of stores is nine. The number written inside the truck in FIG. 3 represents a maximum number of products that can be loaded on the truck (hereinafter, referred to as a "maximum loading capacity"). In addition, the number written inside the store in FIG. 3 represents the number of demands for the product in the store.

In addition, in the present embodiment, it is assumed that the number of stores, the number of demands for the product in each store, the number of trucks, the maximum loading capacity of each truck, a moving distance of the truck between the warehouse and each store, and a moving distance of the truck between the stores are known. In the route determination problem according to the present embodiment, a case where a delivery route that minimizes a total value of movement distances traveled by the truck to leave the storage, deliver the products satisfying the number of demands in each store, and finally return to the warehouse will be described as an example. It is assumed that one truck can make a plurality of rounds. The term "round" used herein means that the truck leaves the warehouse, delivers the product to one or more stores, and returns to the warehouse. FIG. 4 shows an example of a solution of the route determination problem of the example of FIG. 3. A solid-line arrow in FIG. 4 indicates a route of a truck having a maximum loading capacity of "6", and a broken-line arrow indicates a route of a truck having a maximum loading capacity of "8". In addition, a one-dot chain line arrow in FIG. 4 indicates a route of a first round of a truck having a maximum loading capacity of "10", and a two-dot chain line arrow indicates a route of a second round of the truck having a maximum loading capacity of "10".

A case where the above-described route determination problem is solved using the Ising machine 26 will be described. First, in order to solve the route determination problem using the Ising machine 26, quantum bits are prepared so as to be able to represent which store each truck visits in which round and in what order. Hereinafter, a variable representing the truck is denoted by t, a variable representing the store is denoted by s, a variable representing an order of the round in which the truck moves is denoted by n, and a variable representing an order at which the truck visits the store in one round is denoted by i.

In addition, hereinafter, the number of stores to which the product is delivered is denoted by S, the number of trucks is denoted by T, the maximum number of rounds of each truck is denoted by N, and the maximum number of stores that can be visited by each truck in one round is denoted by I. In this case, the variables are $s \in S_s = \{1, 2, \ldots, S, S+1\}$, $t \in T_s = \{1, 2, \ldots, T\}$, $n \in N_s = \{1, 2, \ldots, N\}$, and $i \in I_s = \{1, 2, \ldots, I\}$. A case where a subscript is added with "s" represents a set. For $S_s$, S+1 is added to the last element of the set to represent that the truck finally returns to the warehouse. In addition, N is assumed to be a number larger than 1. This is because, in the above-described route determination problem, the maximum loading capacity of the truck is set, and thus there is a possibility that the products cannot be delivered to all the stores in one round even in a case where all the trucks share the delivery.

Figure 5:
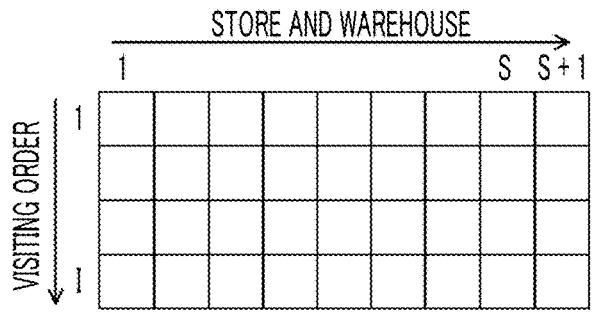
FIG. 5 is a diagram showing an example of quantum bits representing a first round of one truck.

Next, an assignment method of the quantum bits for constructing the QUBO model that can be executed by the Ising machine 26 will be described. First, a first round of one truck (that is, n=1) is defined. As shown in FIG. 5 as an example, since all the stores are candidates for a visit destination of the truck in the first round, and the number of stores to be visited in the first round is unknown, quantum bits of (S+1)×I are prepared for one round. In the example of FIG. 5, the quantum bits are two-dimensionally arranged, and a vertical direction represents the variable i and a horizontal direction represents the variable s.

Figure 6:
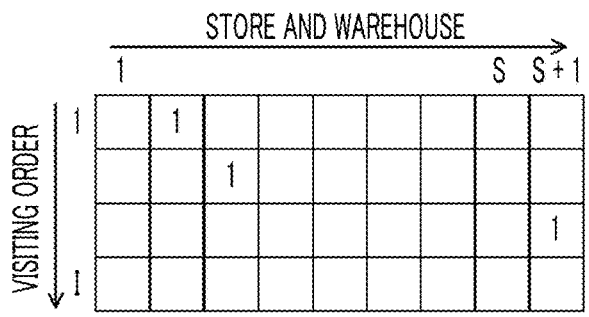
FIG. 6 is a diagram showing an example of quantum bits representing a solution of a first round of one truck.

A result of solving the route determination problem is represented as shown in FIG. 6 as an example. In FIG. 6, a portion where a value of the quantum bit is "1" represents that the store is visited, and a portion where the value of the quantum bit is "0" represents that the store is not visited. In FIG. 6, the description of "0" is omitted for the portion where the value of the quantum bit is "0", and the portion is left blank. The same applies to FIGS. 7 and 8, which will be described below. In the example of FIG. 6, it is represented that, in the first round, the truck visits a store 2 first, visits a store 3 second, and returns to the warehouse third.

Figure 7:
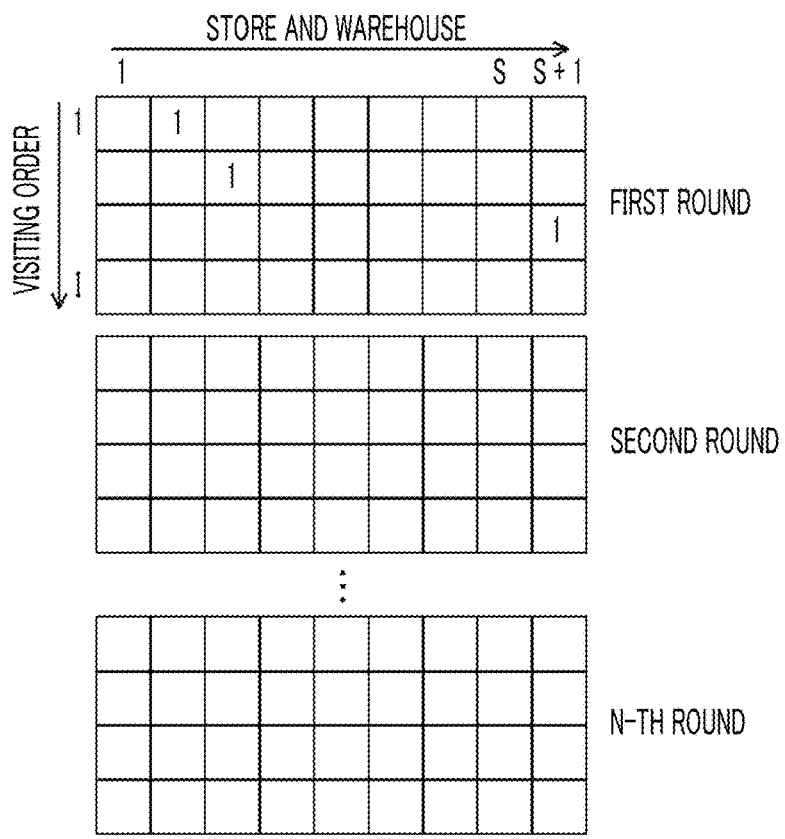
FIG. 7 is a diagram showing an example of quantum bits representing a plurality of rounds of one truck.
Figure 8:
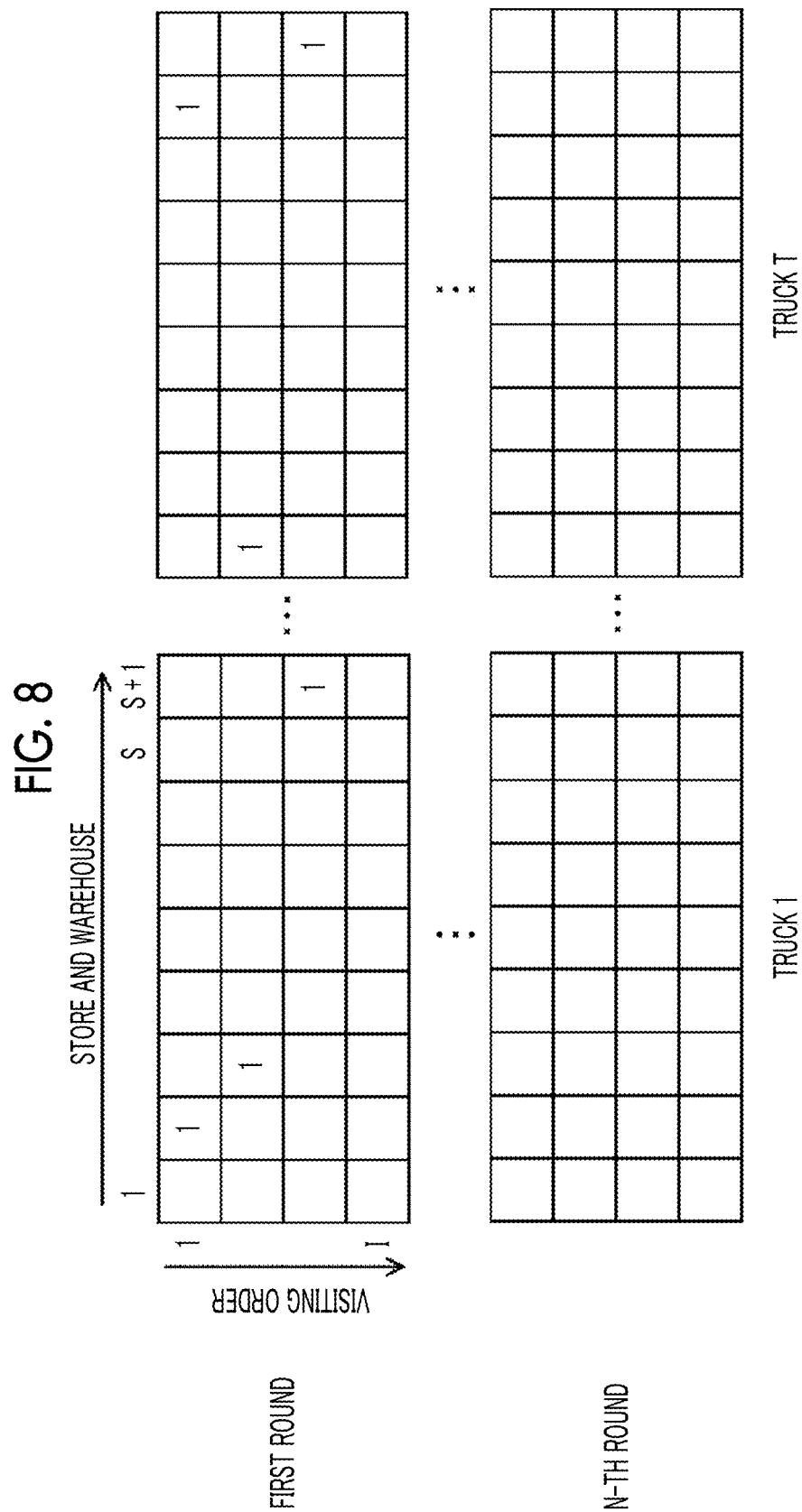
FIG. 8 is a diagram showing an example of quantum bits representing a plurality of rounds of a plurality of trucks.

Since the quantum bits shown in FIGS. 5 and 6 are for one round, as shown in FIG. 7 as an example, the quantum bits of one truck can be defined by preparing the quantum bits for N rounds. That is, the number of the quantum bits required to represent one truck is (S+1)×N×I. Further, as shown in FIG. 8 as an example, the solution of the route determination problem shown in FIG. 3 can be represented by preparing the quantum bits of one truck for the number of tracks. That is, the number of bits required in the example shown in FIG. 8 is T×(S+1)×N×I.

Next, an example of a constraint condition and an objective function of the route determination problem included in the problem data 32 is shown. First, symbols are defined as follows.

$Q_{t,s,n,i} \in \{0,1\}$: quantum bit representing whether or no truck t visits store s in i-th order of n-th round $W_t \in \mathbb{N}$: maximum loading capacity of truck t $P_s \in \mathbb{N}$: the number of demands for product in store s $D_{s,s'} \in \mathbb{R}$: moving distance of truck between store s and store s'

$D_{d,s} \in \mathbb{R}$: moving distance of truck between warehouse and store s The constraint conditions are represented by Expressions (1) to (6). Expression (1) represents a condition that all the stores are visited by one truck only once. Expression (2) represents a condition that the number of stores that can be visited by one truck at a time is one store. Expression (3) represents a condition that each truck visits the store in order, such as first, second, and the like. Specifically, as shown in FIG. 6, Expression (3) represents a condition that the truck starts visiting from the first store and visits the store in the order of the second, third, . . . , until the truck finally returns to the warehouse, that is, there is no row with only the value of the quantum bit of "0" between the first row and the row representing the return to the warehouse.

Expression (4) represents a condition that the number of products to be delivered by each truck is equal to or less than the maximum loading capacity of each truck. Expression (5) represents a condition that each truck returns to the warehouse in each round. Expression (6) represents a condition that each truck does not visit the store after returning to the warehouse in each round.

$$\sum_{t=1}^{T}\sum_{n=1}^{N}\sum_{i=1}^{I} Q_{t,s,n,i} = 1 \forall s \in S\backslash S+1 \quad (1)$$

$$\sum_{s=1}^{S+1} Q_{t,s,n,i} = 1 \ \forall t \in T, \forall n \in N, \forall i \in I \quad (2)$$

$$\sum_{s=1}^{S+1} Q_{t,s,n,i} \geq \sum_{s=1}^{S+1} Q_{t,s,n,i+1} \forall i \in I\backslash I, \forall n \in N, \forall t \in T \quad (3)$$

$$\sum_{s=1}^{S+1}\sum_{i=1}^{I} Q_{t,s,n,i} \cdot P_s \leq W_t \ \forall t \in T, \forall n \in N \quad (4)$$

$$\sum_{i=1}^{I} Q_{t,S+1,n,i} = 1 \forall t \in T, \forall n \in N, \forall i \in I \quad (5)$$

$$Q_{t,S+1,n,i} + \sum_{s=1}^{S}\sum_{j=i+1}^{I} Q_{t,s,n,j} \leq 1 \ \forall i \in I\backslash I, \forall n \in N, \forall t \in T \quad (6)$$

The objective function for minimizing a total value of the moving distances of the truck is represented by Expression (7). This objective function is an objective function used for solving the above-described route determination problem, and is hereinafter referred to as a "first objective function".

$$\min \sum_{n=1}^{N}\sum_{t=1}^{T}\left( D_{d,s} \cdot \sum_{s=1}^{S+1} Q_{t,s,n,1} + \sum_{i=1}^{I-1}\sum_{s=1}^{S+1}\sum_{s'=1}^{S+1} Q_{t,s,n,i} \cdot Q_{t,s',n,i+1} \cdot D_{s,s'} \right) \quad (7)$$

The QUBO model defined by Expressions (1) to (7) can be solved by the Ising machine 26. In this case, S and T are uniquely determined from the problem setting, but N and I are optional values and are set to values with a margin by a user, for example. This is because the user cannot know in advance the values of N and I, which are not made infeasible in a case where the problem is solved using the Ising machine 26. For example, in the route determination problem of the example shown in FIG. 3, since the "10" truck having the maximum loading capacity can visit four stores at most in one round while satisfying the above-described constraint conditions, I is set to a value of 4 or more.

In this way, in a case where the user sets the values of N and I not to be infeasible in accordance with the problem setting, the empirical rule, and the like, the values of N and I are large values with a margin, and thus the number of quantum bits is also increased. This is because the values of the unknown variables i and n in the above-described route determination problem are correlated with the number of quantum bits in a case where the route determination problem is solved using the Ising machine 26. It is difficult to increase the number of quantum bits, which is a calculation unit of the quantum computer, so that it is preferable to reduce the number of quantum bits in a case where the route determination problem is calculated using the Ising machine 26.

In addition, the data size of the QUBO model input to the Ising machine 26 is proportional to a numerical value of the number of quantum bits×the number of quantum bits, that is, the square of the quantum bit, which is obtained by arranging a coefficient of each quantum bit $Q_{t,s,n,i}$ obtained by Expressions (1) to (7) and a coefficient of $Q_{t,s,n,i} \times Q_{t',s',n',i'}$, which is the multiplication of two quantum bits. Therefore, in a case where the number of quantum bits is increased, the data size of the QUBO model is also increased. Therefore, also from the viewpoint of the data size, it is preferable to reduce the number of quantum bits in a case where the route determination problem is calculated using the Ising machine 26.

Therefore, the information processing apparatus 10 according to the present embodiment has a function of reducing the number of quantum bits in a case where the route determination problem is calculated using the Ising machine 26.

Figure 9:
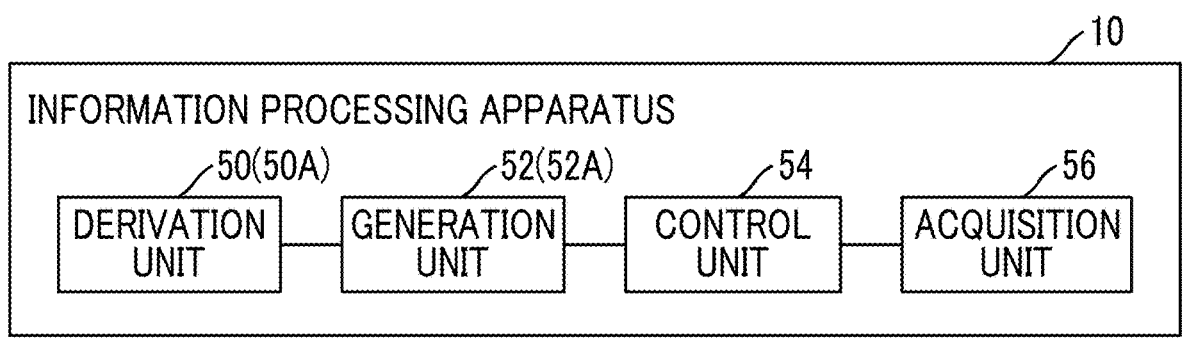
FIG. 9 is a block diagram showing an example of a functional configuration of the information processing apparatus.

Next, a functional configuration of the information processing apparatus 10 according to the present embodiment will be described with reference to FIG. 9. As shown in FIG. 9, the information processing apparatus 10 includes a derivation unit 50, a generation unit 52, a control unit 54, and an acquisition unit 56. The CPU 20 executes the information processing program 30 to function as the derivation unit 50, the generation unit 52, the control unit 54, and the acquisition unit 56.

The derivation unit 50 derives the minimum values for the unknown variables i and n within a range in which a feasible solution of the route determination problem is obtained by using a second objective function different from the first objective function. The second objective function is represented by Expression (8).

$$\sum_{t=1}^{T}\sum_{s=1}^{S}\sum_{i=1}^{I}\sum_{n=1}^{N} Q_{t,s,n,i} \cdot i \cdot n \quad (8)$$

In the second objective function, a value to be minimized is a total value of I, which is an upper limit value of the variable i, and N, which is an upper limit value of the variable n. In Expression (8), the variable i and the variable n are included in the objective function, whereby a solution is obtained in which the number of stores visited by the truck per one round and the number of rounds are minimized.

Specifically, the derivation unit 50 performs a process of solving the route determination problem in which the objective function is changed from the first objective function to the second objective function. Among the values of i and n in a case where the value of $Q_{t,s,n,i}$ is 1 in a solution in which the output of Expression (8) obtained by this process is minimized, maximum values of i and n correspond to minimum values of I and N within the range in which the feasible solution of the route determination problem is obtained. Here, the minimum values of I and N are referred to as I' and N', respectively. That is, I' and N' correspond to the minimum upper limit values I and N of the variables i and n within the range in which the feasible solution of the route determination problem is obtained, which is derived by using the second objective function.

The second objective function is an objective function capable of relaxing the constraint conditions compared to the first objective function. Specifically, in Expression (8) representing the second objective function, the calculation of the moving distance of the truck is not necessary, so that Expressions (3) and (6), which are the constraint conditions related to the visiting order of the store among the constraint conditions of Expressions (1) to (6), can be ignored. Accordingly, it is possible to reduce the amount of calculation.

As the solution processing by the derivation unit 50, for example, a known method such as a branch and bound method, a local search method, an evolutionary computation method such as a genetic algorithm, or a swarm intelligence optimization method such as ant colony optimization can be used.

The generation unit 52 generates the QUBO model including N' and I' derived by the derivation unit 50 and the first objective function. Specifically, the generation unit 52 generates the QUBO model in which the route determination problem is set to a data format feasible by the Ising machine 26, by using N' and I' derived by the derivation unit 50 and Expressions (1) to (7). The QUBO model includes information required for solving the route determination problem, such as the values of N' and I', the constraint conditions, the first objective function, a representation method of the quantum bits, and the problem setting.

Figure 10:
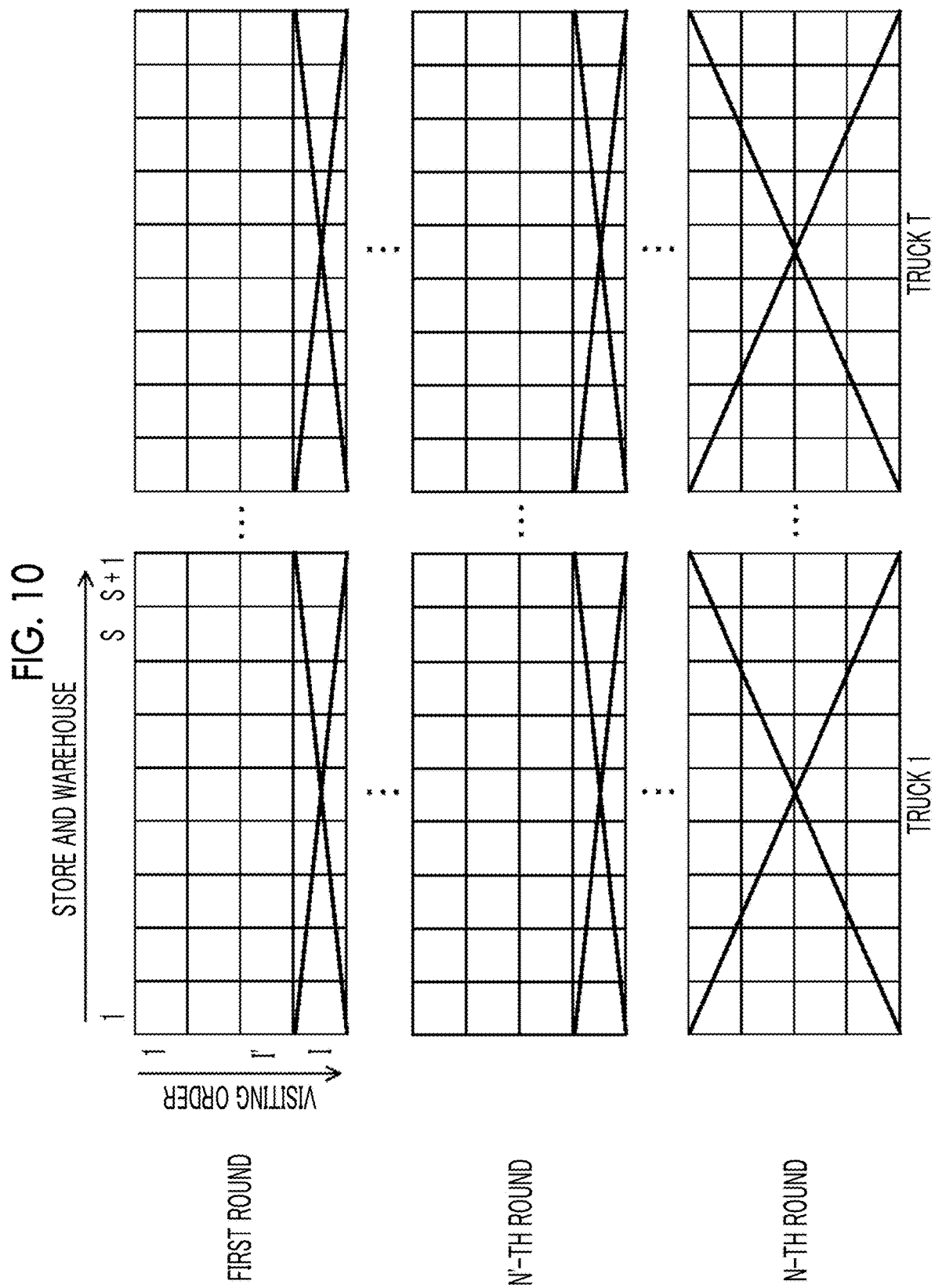
FIG. 10 is a diagram for describing quantum bits to be reduced according to the first embodiment.

In the QUBO model generated by the generation unit 52, the upper limit values I' and N' of the unknown variables i and n are smaller than I and N set by the user to have a margin such that the feasible solution is obtained. Accordingly, as shown in FIG. 10 as an example, it is possible to reduce the number of quantum bits in a case where the route determination problem is calculated using the Ising machine 26. Specifically, in a case where the quantum bits are two-dimensionally arranged, the quantum bits from the (I'+1)-th row to the I-th row are reduced from the first round to the N'-th round. In addition, in this case, the total number of quantum bits from the first row to the I-th row is reduced from the (N'+1)-th round to the N-th round.

The control unit 54 performs control of causing the Ising machine 26 to execute the process of solving the route determination problem defined by the QUBO model generated by the generation unit 52. Specifically, the control unit 54 outputs the QUBO model generated by the generation unit 52 to the Ising machine 26 via the bus 27. In addition, the control unit 54 performs control of storing a result of the solution processing acquired by the acquisition unit 56, which will be described below, in the storage unit 22. The control unit 54 may perform control of displaying the result of the solution processing on the display 23.

The acquisition unit 56 acquires, from the Ising machine 26, the result of the solution processing of the route determination problem by the Ising machine 26 via the bus 27.

Figure 11:
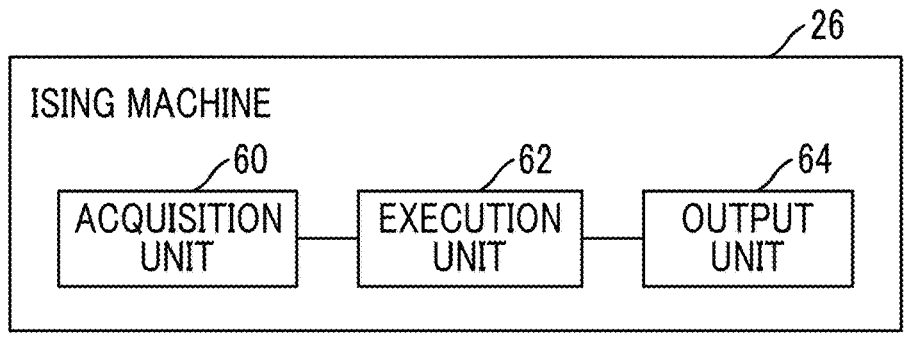
FIG. 11 is a block diagram showing an example of a functional configuration of the Ising machine.

Next, a functional configuration of the Ising machine 26 according to the present embodiment will be described with reference to FIG. 11. As shown in FIG. 11, the Ising machine 26 includes an acquisition unit 60, an execution unit 62, and an output unit 64. The processor 40 functions as the acquisition unit 60, the execution unit 62, and the output unit 64.

The acquisition unit 60 acquires the QUBO model input from the CPU 20. The execution unit 62 executes the process of solving the route determination problem defined by the QUBO model acquired by the acquisition unit 60. The output unit 64 outputs the result of the solution processing of the route determination problem by the execution unit 62 to the CPU 20 via the bus 27.

Next, an operation of the information processing apparatus 10 according to the present embodiment will be described with reference to FIGS. 12 and 13. The CPU 20 executes the information processing program 30 to execute model generation processing shown in FIG. 12. The model generation processing shown in FIG. 12 is executed, for example, in a case where an instruction to start execution is input by the user via the input device 24.

Figure 12:
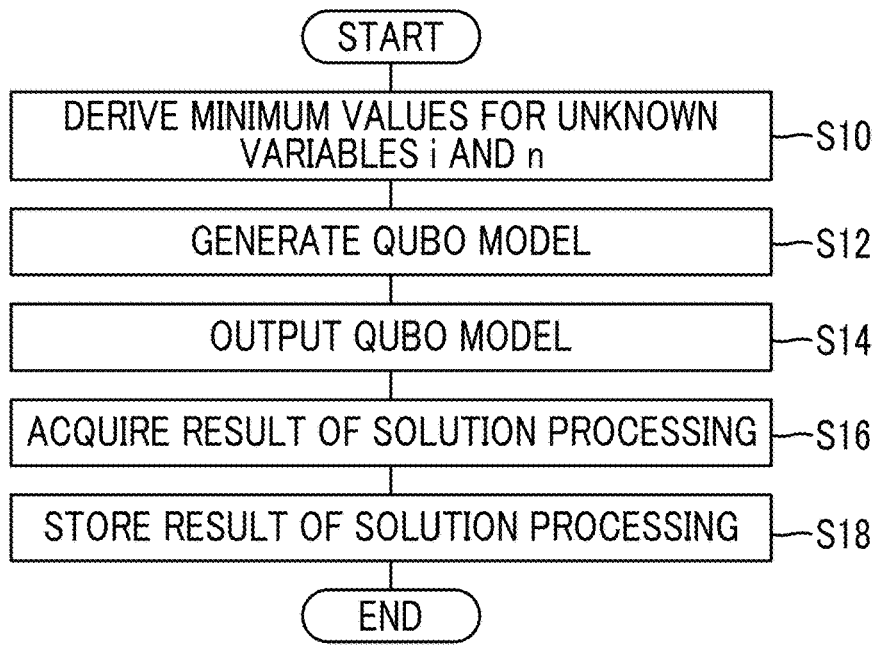
FIG. 12 is a flowchart showing an example of model generation processing.

In step S10 of FIG. 12, as described above, the derivation unit 50 derives the minimum values for the unknown variables i and n within a range in which a feasible solution of the route determination problem is obtained by using a second objective function different from the first objective function. In step S12, the generation unit 52 generates the QUBO model including N' and I' derived in step S10 and the first objective function, as described above.

In step S14, the control unit 54 outputs the QUBO model generated in step S12 to the Ising machine 26 via the bus 27. In step S16, the acquisition unit 56 acquires, from the Ising machine 26, the result of the solution processing of the route determination problem by the Ising machine 26 via the bus 27. In step S18, the control unit 54 performs control of storing the result of the solution processing acquired in step S16 in the storage unit 22. In a case where the process of step S18 ends, the model generation processing ends.

Figure 13:
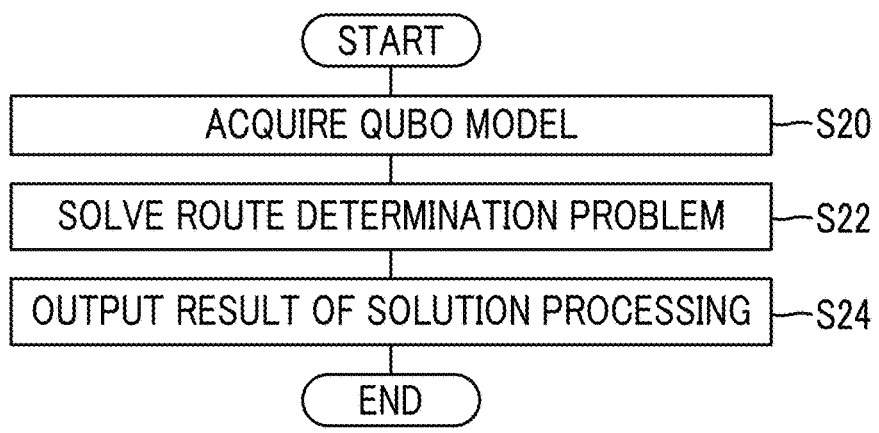
FIG. 13 is a flowchart showing an example of solution processing.

In a case where the QUBO model is input from the CPU 20 to the Ising machine 26 in step S14 of the model generation processing, the processor 40 executes the solution processing shown in FIG. 13.

In step S20 of FIG. 13, the acquisition unit 60 acquires the QUBO model input from the CPU 20. In step S22, the execution unit 62 executes the process of solving the route determination problem defined by the QUBO model acquired in step S20. In step S24, the output unit 64 outputs the result of the solution processing of the route determination problem by the process of step S22 to the CPU 20 via the bus 27. In a case where the process of step S24 ends, the solution processing ends. The result of the solution processing input to the CPU 20 in step S24 is acquired in step S16 of the model generation processing.

As described above, according to the present embodiment, it is possible to reduce the number of quantum bits in a case where the route determination problem is calculated using the Ising machine 26.

Second Embodiment

A second embodiment of the disclosed technique will be described. Hardware configurations of the information processing apparatus 10 and the Ising machine 26 according to the present embodiment are the same as those of the first embodiment, and thus the description thereof will be omitted.

Figure 14:
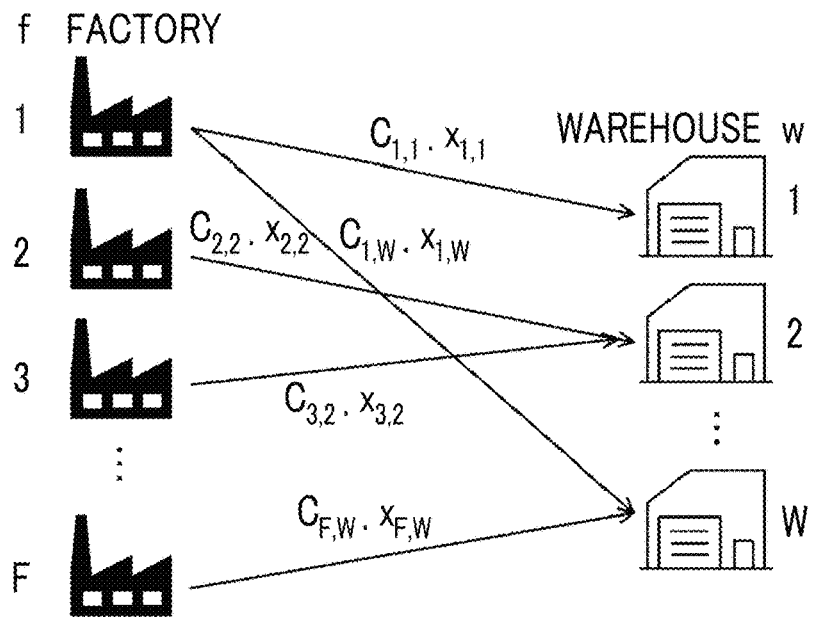
FIG. 14 is a schematic diagram for describing an optimization problem according to a second embodiment.

Next, an example of the optimization problem represented by the problem data 32 according to the present embodiment will be described with reference to FIG. 14. As shown in FIG. 14, in the present embodiment, as an example of the optimization problem, an example will be described in which a problem (hereinafter, referred to as an "inventory delivery problem") of determining the amount of products to be delivered so that, in a case where products are delivered from a plurality of factories to a plurality of warehouses, the number of demands for the product in each warehouse is satisfied and the delivery cost is minimized is applied.

Hereinafter, a variable representing the factory is denoted by f, a variable representing the warehouse is denoted by w, a variable representing the delivery cost per one product in a case of delivering the product from the factory to the warehouse is denoted by $C_{f,w}$, and the number of products delivered from the factory to the warehouse is denoted by $x_{f,w}$. In addition, hereinafter, the number of factories is denoted by F, and the number of warehouses is denoted by W. In this case, the variable f is $f \in f_s = \{1, 2, \ldots, F\}$, and the variable w is $w \in w_s = \{1, 2, \ldots, W\}$. A case where a subscript is added with "s" represents a set.

The first objective function in the inventory delivery problem is represented by Expression (9) shown below. The inventory delivery problem is a problem of obtaining a value of the unknown variable $x_{f,w}$.

$$\min \sum_{f=1}^{F} \sum_{w=1}^{W} C_{f,w} \cdot x_{f,w} \tag{9}$$

Examples of constraint conditions in solving the inventory delivery problem include satisfying the number of demands for the product in each warehouse and making a total value of the numbers of products to be delivered from the factories to the warehouses equal to or less than the number of products that can be produced in each factory, that is, $FM_f$.

In order to solve the inventory delivery problem by the Ising machine 26, $x_{f,w}$, which is a 10-digit positive integer, is represented by a quantum bit, and the following two examples of a representation method are given.

A first representation method is a method of preparing a quantum bit group including a plurality of quantum bits of a number represented by Expression (10) and representing the value of the unknown variable $x_{f,w}$ at a position where the quantum bit is 1 in the quantum bit group.

$$\sum_{f=1}^{F} FM_f \times W \tag{10}$$

Figure 15:
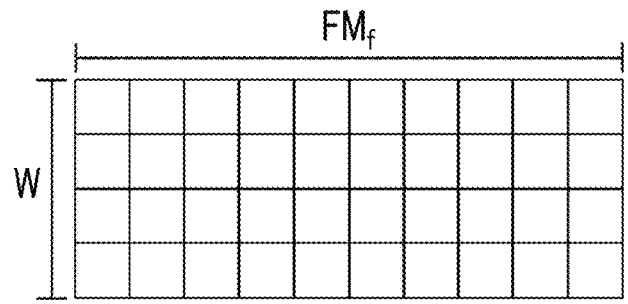
FIG. 15 is a diagram for describing an example of a representation method of quantum bits according to the second embodiment.

Specifically, as shown in FIG. 15 as an example, the quantum bits are two-dimensionally arranged, and a vertical direction represents an order of the warehouse, and a horizontal direction represents the number of the products to be delivered to the warehouse. That is, in the example of FIG. 15, the above-described quantum bit group is a quantum bit array. The number of bits in the horizontal direction is the same as the number of producible products $FM_f$, and the number of products to be delivered to the warehouse is represented by the order of the quantum bit from the beginning (left end in the example of FIG. 15) at which the value of the quantum bit is 1. The number of products to be delivered to the warehouse may be represented by the order of the quantum bit from the end in the horizontal direction (right side in the example of FIG. 15) at which the value of the quantum bit is 1.

Figure 16:
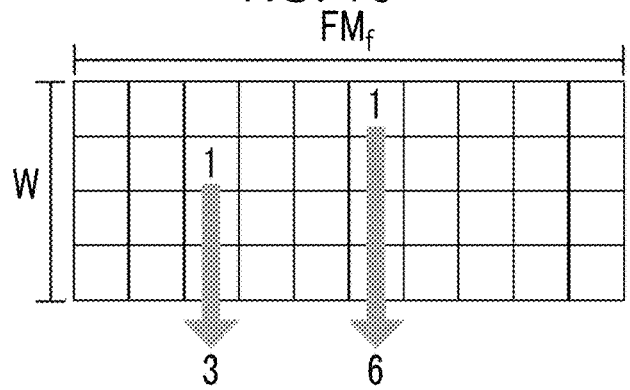
FIG. 16 is a diagram for describing an example of a representation method of quantum bits according to the second embodiment.
Figure 18:
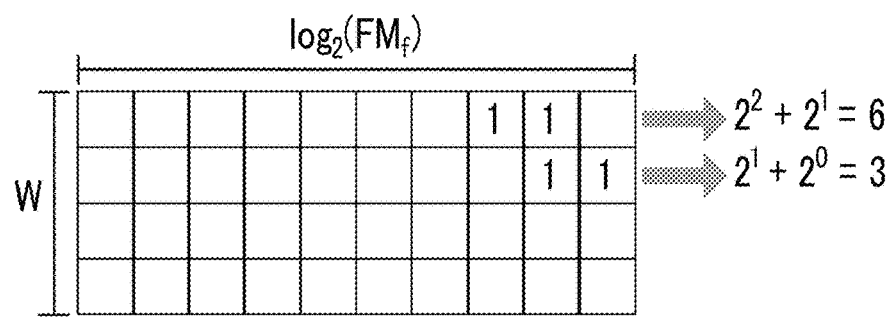
FIG. 18 is a diagram for describing another example of a representation method of quantum bits according to the second embodiment.

For example, in a case where the position where the value of the quantum bit is 1 is the position shown in FIG. 16, it is represented that six products are delivered to a warehouse 1 and three products are delivered to a warehouse 2. In FIG. 16, the description of "0" is omitted for the portion where the value of the quantum bit is "0", and the portion is left blank. The same applies to FIG. 18, which will be described below. In the example of FIG. 16, the number of products to be delivered to the warehouse is represented at the position where the quantum bit is 1, but the number of products to be delivered to the warehouse may be represented at the position where the quantum bit is 0. In this case, 0 and 1 of the value of the quantum bit shown in FIG. 16 are interchanged.

A second representation method is a method of preparing quantum bits of a number represented by Expression (11), making one quantum bit correspond to one bit of a binary number, and representing the value of the unknown variable $x_{f,w}$ by a binary number in which a plurality of quantum bits are combined.

$$\sum_{f=1}^{F} \log_2(FM_f) \times W \tag{11}$$

Figure 17:
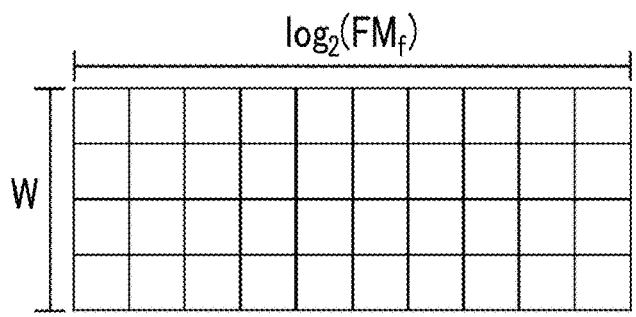
FIG. 17 is a diagram for describing another example of a representation method of quantum bits according to the second embodiment.

Specifically, as shown in FIG. 17 as an example, the quantum bits are two-dimensionally arranged, and a vertical direction represents an order of the warehouse, and a horizontal direction represents the number of the products to be delivered to the warehouse. The number of bits in the horizontal direction is the same as $\log_2(FM_f)$, and the bit string in the horizontal direction represents a binary number. For example, in a case where the position where the value of the quantum bit is 1 is the position shown in FIG. 18, it is represented that six products are delivered to a warehouse 1 and three products are delivered to a warehouse 2.

In the first representation method, the number of required quantum bits is larger than that in the second representation method, but the constraint conditions are simple, so that a possibility that the feasible solution is obtained is high. In the second representation method, the number of required quantum bits is smaller than that in the first representation method, but an additional constraint condition for associating the quantum bit corresponding to the binary number with the 10-digit positive integer representing the number of delivered products is required, so that a probability that the feasible solution is not obtained is low. Hereinafter, an example using the first representation method will be described.

Next, a functional configuration of the information processing apparatus 10 according to the present embodiment will be described with reference to FIG. 9. Functional units having the same functions as the first embodiment will be denoted by the same reference numerals as the first embodiment, and thus the description thereof will be omitted. As shown in FIG. 9, the information processing apparatus 10 includes a derivation unit 50A, a generation unit 52A, a control unit 54, and an acquisition unit 56. The CPU 20 executes the information processing program 30 to function as the derivation unit 50A, the generation unit 52A, the control unit 54, and the acquisition unit 56.

The derivation unit 50A derives the minimum value for the unknown variable $x_{f,w}$ within a range in which a feasible solution of the inventory delivery problem is obtained by using a second objective function different from the first objective function. The second objective function is represented by Expression (12). Expression (12) is an expression for minimizing the maximum value of the number of products to be delivered from the factory f to the warehouse w.

$$\min(\max(x_{f,w}\forall f,w)) \tag{12}$$

Specifically, the derivation unit 50A performs a process of solving the inventory delivery problem in which the objective function is changed from the first objective function to the second objective function. A solution obtained by this process is denoted by $x'_{f,w}$, and the minimum value thereof is $M=\min(x'_{f,w})$, $\forall x'_{f,w} > 0$. This M corresponds to the minimum value of the unknown variable $x_{f,w}$ within the range in which the feasible solution of the inventory delivery problem is obtained. In addition, this M can be said to be the minimum number of products to be delivered in all combinations of the factory and the warehouse for which the delivery of the product is required. Therefore, the number of quantum bits required in this case is represented by Expression (13) using M.

$$\sum_{w=1}^{W}\sum_{f=1}^{F}\begin{cases} FM_f & x'_{f,w} = 0 \\ FM_f - (M-1) & x'_{f,w} > 0 \end{cases} \tag{13}$$

Figure 19:
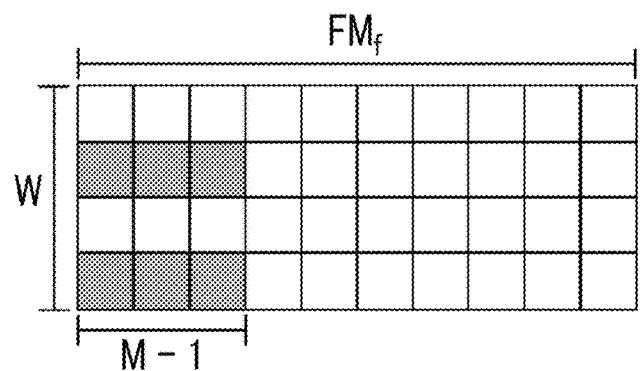
FIG. 19 is a diagram for describing quantum bits to be reduced according to the second embodiment.

As shown in FIG. 19 as an example, Expression (13) represents that the quantum bit representing being less than the minimum number of delivered products M is unnecessary in the combination of the factory and the warehouse for which the delivery of the product is required. FIG. 19 shows that the quantum bit of the portion filled with a gray color is unnecessary. That is, in the example of FIG. 19, the M−1 quantum bits are reduced for the warehouse for which the delivery of the product is required.

The generation unit 52A generates the QUBO model including M derived by the derivation unit 50A and the first objective function. Specifically, the generation unit 52A generates the QUBO model in which the inventory delivery problem is set to a data format feasible by the Ising machine 26, by using M derived by the derivation unit 50A, the constraint conditions, and the first objective function.

The description of the function of the Ising machine 26 according to the present embodiment will be omitted because the optimization problem to be processed is only different from that of the first embodiment.

In addition, the description of the action of the information processing apparatus 10 according to the present embodiment will be omitted from the description because the optimization problem to be processed is different only from that of the first embodiment, and the processing flow is the same as that of the first embodiment (see FIGS. 12 and 13). Specifically, the only difference from the first embodiment is the value M for the unknown variable $x_{f,w}$ derived in step S10 of FIG. 12 and the QUBO model generated in step S12.

As described above, according to the present embodiment, it is possible to reduce the number of quantum bits in a case where the inventory delivery problem is calculated using the Ising machine 26.

In each of the above-described embodiments, a case where the QUBO model is applied as the mathematical model to be handled by the Ising machine 26 has been described, but the present disclosure is not limited to this. An Ising model may be applied as the mathematical model. In the QUBO model, the optimization problem is modeled by a quadratic form of a binary variable of 0 or 1, but in the Ising model, the optimization problem is modeled by a quadratic form of a binary variable of −1 or 1. In addition, the QUBO model and the Ising model can be converted into each other by a known method.

In addition, in the above-described embodiment, for example, as a hardware structure of a processing unit that executes various kinds of processing such as processing performed by the derivation units 50 and 50A, the generation units 52 and 52A, the control unit 54, and the acquisition unit 56, various processors shown below can be used. The various processors include, in addition to a CPU that is a general-purpose processor functioning as various processing units by executing software (program) as described above, a programmable logic device (PLD) that is a processor whose circuit configuration can be changed after manufacture such as an FPGA, a dedicated electric circuit that is a processor having a circuit configuration dedicatedly designed to execute specific processing such as an application specific integrated circuit (ASIC), and the like.

One processing unit may be configured of one of the various processors, or may be configured of a combination of the same or different kinds of two or more processors (for example, a combination of a plurality of FPGAs or a combination of the CPU and the FPGA). In addition, a plurality of processing units may be configured of one processor.

As an example in which a plurality of processing units are configured of one processor, first, as typified by a computer such as a client or a server, there is an aspect in which one processor is configured of a combination of one or more CPUs and software, and this processor functions as a plurality of processing units. Second, as typified by a system on chip (SoC) or the like, there is an aspect in which a processor that implements functions of the entire system including the plurality of processing units via one integrated circuit (IC) chip is used. As described above, various processing units are configured by using one or more of the various processors as a hardware structure.

Further, as the hardware structure of the various processors, more specifically, an electric circuit (circuitry) in which circuit elements such as semiconductor elements are combined may be used.

In addition, in the embodiment described above, an aspect has been described in which the information processing program 30 is stored (installed) in the storage unit 22 in advance, but the present disclosure is not limited to this. The information processing program 30 may be provided in a form of being recorded in a recording medium such as a compact disc read only memory (CD-ROM), a digital versatile disc read only memory (DVD-ROM), and a universal serial bus (USB) memory. In addition, the information processing program 30 may be downloaded from an external device via a network.

The disclosure of JP2021-191810 filed on Nov. 26, 2021 is incorporated herein by reference in its entirety. In addition, all literatures, patent applications, and technical standards described herein are incorporated by reference to the same extent as if the individual literature, patent applications, and technical standards were specifically and individually stated to be incorporated by reference.

What is claimed is:

1. An information processing apparatus comprising at least one processor and causing an Ising machine to execute a process of solving an optimization problem by obtaining a value of an unknown variable using a first objective function, the value of the unknown variable being correlated with the number of quantum bits used in solving the optimization problem using the Ising machine,
    wherein the processor
        derives a smallest value for the unknown variable within a range in which a feasible solution of the optimization problem is obtained by using a second objective function different from the first objective function, and
        performs control of causing the Ising machine to execute a process of solving the optimization problem defined by a mathematical model including the derived value for the unknown variable and the first objective function.

2. The information processing apparatus according to claim 1,
    wherein the second objective function is an objective function capable of relaxing a constraint condition compared to the first objective function.

3. The information processing apparatus according to claim 1,
    wherein the unknown variable is stored in a quantum bit group including a plurality of quantum bits, and
    the value of the unknown variable is represented by a position where the quantum bit is 0 or 1 in the quantum bit group.

4. The information processing apparatus according to claim 1,
    wherein the Ising machine including at least one processor is provided, and the processor of the Ising machine executes the process of solving the optimization problem defined by the mathematical model.

5. An information processing method executed by a processor of an information processing apparatus including at least one processor and causing an Ising machine to execute a process of solving an optimization problem by obtaining a value of an unknown variable using a first objective function, the value of the unknown variable being correlated with the number of quantum bits used in solving the optimization problem using the Ising machine, the method comprising:

deriving a smallest value for the unknown variable within a range in which a feasible solution of the optimization problem is obtained by using a second objective function different from the first objective function; and performing control of causing the Ising machine to execute a process of solving the optimization problem defined by a mathematical model including the derived value for the unknown variable and the first objective function.

6. An information processing program executed by a processor of an information processing apparatus including at least one processor and causing an Ising machine to execute a process of solving an optimization problem by obtaining a value of an unknown variable using a first objective function, the value of the unknown variable being correlated with the number of quantum bits used in solving the optimization problem using the Ising machine, the program causing the processor to execute:

deriving a smallest value for the unknown variable within a range in which a feasible solution of the optimization problem is obtained by using a second objective function different from the first objective function; and performing control of causing the Ising machine to execute a process of solving the optimization problem defined by a mathematical model including the derived value for the unknown variable and the first objective function.

7. The information processing program of claim 6, wherein the information processing program is stored on a non-transitory computer-readable storage medium.

* * * * *